United States Patent [19]
Yu

[11] Patent Number: 5,589,998
[45] Date of Patent: Dec. 31, 1996

[54] CYLINDER ADDRESS STORAGE IN MULTIPLE SERVO SECTORS OF A TRACK

[75] Inventor: Mantle M. Yu, San Jose, Calif.

[73] Assignee: International Business Machines Corporation, Armonk, N.Y.

[21] Appl. No.: 361,624

[22] Filed: Dec. 22, 1994

[51] Int. Cl.⁶ .................................................. G11B 5/596
[52] U.S. Cl. .................... 360/78.14; 360/49; 360/77.08; 360/76
[58] Field of Search ................................... 360/49, 78.14, 360/48, 77.08, 76; 395/421.1

[56] References Cited

U.S. PATENT DOCUMENTS

| | | | |
|---|---|---|---|
| 5,210,660 | 5/1993 | Hetzler | 360/51 |
| 5,276,564 | 1/1994 | Hessing et al. | 360/49 X |
| 5,339,207 | 8/1994 | Moon et al. | 360/77.08 X |
| 5,384,671 | 1/1995 | Fisher | 360/49 X |
| 5,459,623 | 10/1995 | Blagaila et al. | 360/78.14 X |

*Primary Examiner*—Aristotelis Psitos
*Assistant Examiner*—James T. Wilson
*Attorney, Agent, or Firm*—Paik Saber

[57] ABSTRACT

A no-ID zone-bit-recording sectored servo data recording disk drive system is described wherein track seek time is substantially reduced by storing only partial cylinder address on each servo sector of each track. According to the system and method described herein, a cylinder address is divided into high order bits, middle order bits, and low order bits. The low order bits is stored on each servo sector of each track. The high order bits is stored only on even number servo sectors and middle order bits is stored only on odd number servo sectors. During the seek operation, as the head passes over the tracks toward the desired track, the partial cylinder address stored on odd and even numbered servo sectors on each track is retrieved and stitched together to form a complete cylinder address. The completed cylinder address is then compared with the desired cylinder address to determine whether desired cylinder is reached or not. By storing only partial cylinder information on each servo sector rather than the full cylinder address, servo seek time is substantially reduced.

36 Claims, 5 Drawing Sheets

| EVEN NUMBER SERVO SECTOR (70) | | | | ODD NUMBER SERVO SECTOR (71) | | | (74) |
|---|---|---|---|---|---|---|---|
| HIGH ORDER CYLINDER ADDRESS (76) | LOW ORDER CYLINDER ADDRESS (77) | .... | DATA SECTOR (72) | MIDDLE ORDER CYLINDER ADDRESS (78) | LOW ORDER CYLINDER ADDRESS (79) | .... | DATA SECTOR |

|  | SUB-FIELD 52 | | | | | SUB-FIELD 54 | | | | |
|---|---|---|---|---|---|---|---|---|---|---|
|  | $a_8$ | $a_7$ | $a_6$ | $a_5$ | $a_4$ | $a_4$ | $a_3$ | $a_2$ | $a_1$ | $a_0$ |
| TRACK 1 → | ∘∘∘ | | | | | ∘∘∘ | | | | | ← 71
| TRACK n−1 → | ∘∘ | | | | | ∘∘ | | | | | ← 71
| TRACK n → | 0 | 0 | 0 | 0 | 0 | 0 | 1 | 0 | 0 | 1 | ← 71
| TRACK n+1 → | 0 | 0 | 0 | 0 | 0 | 0 | 1 | 0 | 0 | 0 | ← 71
| TRACK n+2 → | 0 | 0 | 0 | 0 | 1 | 1 | 1 | 0 | 0 | 0 | ← 71
| TRACK n+3 → | 0 | 0 | 0 | 0 | 1 | 1 | 1 | 0 | 0 | 1 | ← 71
| TRACK n+4 → | 0 | 0 | 0 | 0 | 1 | 1 | 1 | 0 | 1 | 1 | ← 71
| TRACK 2n → | ∘∘∘ | | | | | ∘∘∘ | | | | | ← 71

FIG. 8a

|  | SUB-FIELD 52 | | | | | SUB-FIELD 54 | | | | |
|---|---|---|---|---|---|---|---|---|---|---|
|  | $a_8$ | $a_7$ | $a_6$ | $a_5$ | $a_4$ | $a_4$ | $a_3$ | $a_2$ | $a_1$ | $a_0$ |
| TRACK 1 → | ∘∘∘ | | | | | ∘∘∘ | | | | | ← 71
| TRACK n−1 → | ∘∘ | | | | | ∘∘ | | | | | ← 71
| TRACK n → | 0 | 0 | 0 | 0 | 0 | 0 | 1 | 0 | 0 | 1 | ← 71
| TRACK n+1 → | 0 | 0 | 0 | 0 | 0 | 0 | 1 | 0 | 0 | 0 | ← 71
| TRACK n+2 → | 0 | 0 | 0 | 0 | 0 | 1 | 1 | 0 | 0 | 0 | ← 71
| TRACK n+3 → | 0 | 0 | 0 | 0 | 0 | 1 | 1 | 0 | 0 | 1 | ← 71
| TRACK n+4 → | 0 | 0 | 0 | 0 | 1 | 1 | 1 | 0 | 1 | 1 | ← 71
| TRACK 2n → | ∘∘∘ | | | | | ∘∘∘ | | | | | ← 71

CYLINDER ADDRESS STORAGE IN MULTIPLE SERVO SECTORS OF A TRACK

RELATED APPLICATION

U.S. patent application Ser. No. 08/173,541 (SA9-93-039), filed Dec. 23, 1993, entitled "Sector Architecture for Fixed Block Disk Drive", and assigned to the assignee of the present invention, is hereby incorporated by reference in its entirety.

BACKGROUND OF THE INVENTION

1. Technical Field

This invention relates in general to no-ID data storage disk drives, and in particular to a system and method for storing and identifying cylinder addresses in no-ID disk drives in such a way that reduces track seek time.

2. Description of the Background Art

In a magnetic storage system such as a disk drive, digital information is magnetically stored upon a surface of a magnetic medium in a set of concentric circular patterns called "tracks". The digital information is represented by selectively polarizing the surface of the disk. When this information is read back from the disk, the magnetic polarization of the medium is sensed and converted to an electrical output signal. The read and write operations are performed by read/write electronics in conjunction with a read/write head which "flies" over the surface of the rotating disk and provides an output signal.

Typically, storage disks of a disk drive are stacked in a "disk stack" (also known as "disk pack") which are mounted for rotation together on a single spindle. Each side of each disk in the disk pack has a surface which is usually used to store information.

Each surface of a disk in the disk pack is usually exposed to at least one head responsible for reading and writing information on that particular surface. Typically, all the magnetic heads which are mounted on actuator arms move in tandem radially over the surfaces of the disk so that they are all at the same disk radius at the same time.

In order to accurately move a magnetic head to a desired track and position the head over that track a servo system is utilized. The servo system performs two distinct functions known as a "seek" ("access") function and a "track following" function. During the "seek" operation the servo system moves a read/write head to a selected track from a previous track or from a park position. When the head reaches the desired track, the servo system begins a "track following" operation in which it accurately positions the head over the centerline of the selected track and maintains the head in that position as successive portions of the track pass by the head. It is important to notice that during a seek operation the actuator arm where the head is mounted must be moved as fast as possible so as to minimize the time required for that operation. Since the seek time is one of the most important factors used in measuring the overall performance of a disk drive, it is very important to minimize the time it takes for performing that operation as much as possible.

In order to read and write data from the correct location in the disk pack, the data regions in the disk pack are identified by a cylinder address, head address and sector address (CHS). A "cylinder" identifies a set of specific tracks on the disk surfaces in the disk pack which lie at equal radii and are, in general, simultaneously accessible by the collection of heads. The head address identifies which head can read the data and therefore identifies the disk that the data is recorded on. Each track within a cylinder is further divided into "segments" where each segment comprises one or more "sectors" for storing data.

Many modern disk drives also use a concept known as zone bit recording (ZBR), as taught by Hetzler in U.S. Pat. No. 5,210,660, in which the disk surface is divided into radial zones and the data is recorded at a different data rate in each zone. The addition of zones requires expansion of the cylinder, head, sector (CHS) identification scheme to a zone, cylinder, head, sector (ZCHS) identification scheme.

Some disk files have servo information only on a dedicated surface on one disk in a disk stack. However, many modern disk drives use a servo architecture known as "sectored servo", as taught by Hetzler, U.S. Pat. No. 5,210,660 where servo information is interspersed with the data stored on each disk surface. The servo sectors in sectored servo architecture (also referred to as "sector servo" architecture) contain positioning data on each track to help the magnetic head stay on that track. This latter approach is preferred because it can be implemented at low cost without extra components beyond those required for storing data. Furthermore, it provides the servo information at the data surface being accessed, thereby eliminating all thermal sources of track misregistration (TMR). The use of either sectored servo or dedicated servo surface architectures and the implementation of either of the two are well known to those skilled in the requisite art.

Fixed block architecture (FBA) is a common configuration used to format both dedicated servo disk files and sector servo disk files. In a FBA formatted disk file, each disk track is divided into a number of segments and each segment is divided into one or more sectors for storing servo information, identification information (ID), and data.

Figure 1:
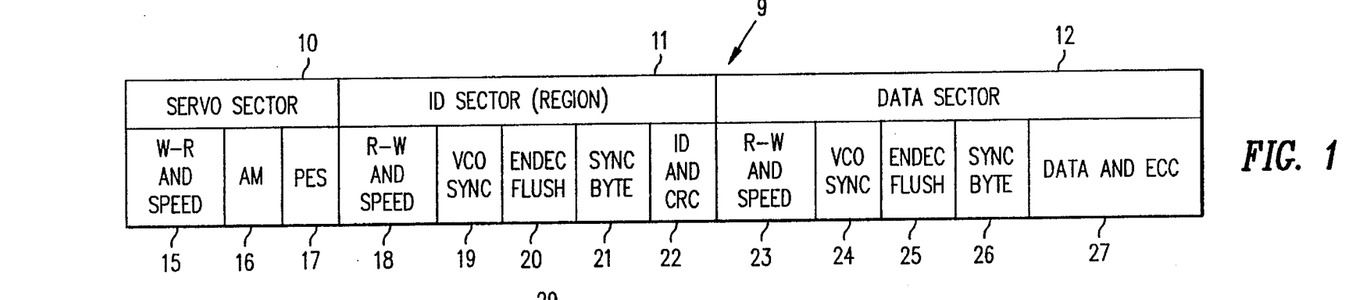
FIG. 1 is a diagram showing the sectors of a segment of a track on a disk file formatted for conventional sectored FBA.

A typical segment 9 of a track on a FBA formatted disk utilizing sectored servo architecture is illustrated in FIG. 1. The segment 9 comprises sequentially a servo sector 10, identification (ID) region 11 and a data sector 12. Servo sector 10 further comprises information such as write-read and speed field 15, address mark (AM) field 16 and position error signal (PES) field 17. ID region 11, which is written onto the disk during the format operation, contains specific information concerning succeeding data sector 12 which can be used during normal operation, either writing or reading, to identify the succeeding data sector 12. ID region 11 typically comprises a read/write and speed field 18, VCO sync field 19, encoder/decoder flush field 20, sync byte 21, and ID and CRC field 22. Data sector 12 typically comprises fields 23–26 which correspond to ID fields 18–21, and data and ECC field 27.

Recently, a new method and system has been developed to increase the capacity of disk drives known as the no-ID format and the disk drive systems utilizing no-ID format are commonly referred to as no-ID disk drive systems. This format has been taught by Hetzler in a co-pending U.S. patent application Ser. No. 07/727,680 (SA9-91-022), filed Jul. 10, 1991, and assigned to the assignee of the present invention.

Briefly stated, in no-ID disk drives implementing a sectored servo architecture, a "full track number identifier" in the position field in the servo region of each sector is used in combination with a defect map to uniquely identify the requested data sectors and thereby completely eliminate the use of ID regions.

In doing so, bad sectors are mapped out of the disk file by means of a defect map. At disk format time, each sector is written to and read from to determine whether it is usable or defective. Clusters of defective sectors are marked bad by recording in the look-up table the sector location identifier of the first bad sector in the cluster and the quantity of consecutive bad sectors in the cluster. During the read/write operations, the disk file performs logical block address (LBA) to physical block address (PBA) conversion (logical to physical sector conversion) by searching the look up table for an entry having a value less than or equal to the requested logical sector location identifier. If none is found, the physical block address is equal to the logical block address. If an entry is found, the corresponding offset representing the quantity of consecutive bad sectors is extracted from the defect map and added to the logical block address of the requested sector to produce the physical block address for that sector. Then the physical block address is converted into cylinder, head and sector (CHS) value or zone, cylinder, head, and sector value corresponding to the logical block address of the requested sector.

Since the ID region is no longer available in no-ID disk drives, cylinder address which is usually a long pattern, has to be stored in some other location on the disk and acquired by a different means. The only possible location for storing cylinder address is in the servo sector.

However, there is a serious disadvantage associated with storing a cylinder address in a servo sector. Information in a servo sector is generally written at a relatively low frequency to ensure, among other things, track to track accurate servo alignment. Writing long cylinder address in a servo sector means that (1) the maximum servo seek velocity is substantially reduced and (2) the disk is no longer being utilized efficiently. The former problem is due to the fact that the maximum velocity of the servo seek is directly proportional to the length of the cylinder address stored in each servo sector on each track. The longer the cylinder address, the longer the track seek time. This is due to the fact that the track seek velocity must be slow enough to ensure that, as the head passes over a given track, the complete cylinder address written in at least one sector of that track is completely read before the head is moved over to another track. Otherwise, only part of the cylinder address can be read by the head which leads to serious servo address errors.

Since average seek time is one of the main factors used in comparing similar disk drives with each other, substantial efforts are being made to find ways to reduce average seek time. Therefore, allowing longer seek time due to long cylinder address would be contradictory to that goal. As a result, there is a great need for an invention that can substantially eliminate overall performance degradation associated with storing cylinder address in the servo sector in no-ID disk drives while improving servo track seek time and disk space utilization.

SUMMARY OF THE INVENTION

It is therefore an object of the present invention to provide a system and a method for reducing the performance degradation associated with storing cylinder address in the servo sector of no-ID disk drives.

It is another object of the present invention to provide a system and method for reducing the time it takes to conduct a track seek operation in no-ID disk drive systems.

It is a further object of the present invention to provide a system and method for reducing the time it takes to conduct a track seek operation in no-ID disk drive systems having zone bit recording.

It is yet another object of the present invention to provide a system and method for improving disk utilization in no-ID disk drive systems.

Toward this end and in accordance with the present invention, a method and means are described wherein in a no-ID disk drive system having sectored servo architecture and zone bit recording, the cylinder address of each cylinder is first encoded into n number of bits. The encoded cylinder address is then divided into m cylinder address sub-sections where each sub-section contains only a portion (also referred to as partial) of the cylinder address. Thereafter, only a predetermined number of the cylinder address sub-sections, less than the total number of the sub-sections, are stored in each servo sector of tracks associated with (corresponding to) a given cylinder. During the read/write operation, in order to construct the completely encoded cylinder address of a given cylinder, the cylinder address sub-sections stored in several servo sectors of an associated (corresponding) track are read and "stitched" together using servo microcode. The stitched pattern provides the complete (whole) cylinder address which can then be compared with the requested (also referred to as desired or target or sought after) cylinder address to determine whether the heads are over the desired cylinder or not.

In the preferred embodiment of the present invention, the encoded cylinder address is divided into three sub-sections, each sub-section has a predetermined number of bits and is referred to as high order bits, middle order bits, and low order bits sub-sections (it is also referred to as high order, middle order, and low order bits cylinder address).

The result is a substantial reduction in the time it takes to carry on a track seek operation in a given disk drive and also improved space savings on the disk. This is due to the fact that according to the present invention, rather than storing the complete cylinder address in each servo sector of a given track, only a partial cylinder address is stored in each servo sector thus substantially improving the servo seek time and storage requirement.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode for carrying out the invention. This description and the number of alternative embodiments shown are made for the purpose of illustrating the general principle of the present invention and is not meant to limit the inventive concepts claimed herein.

Figures 2, 3:
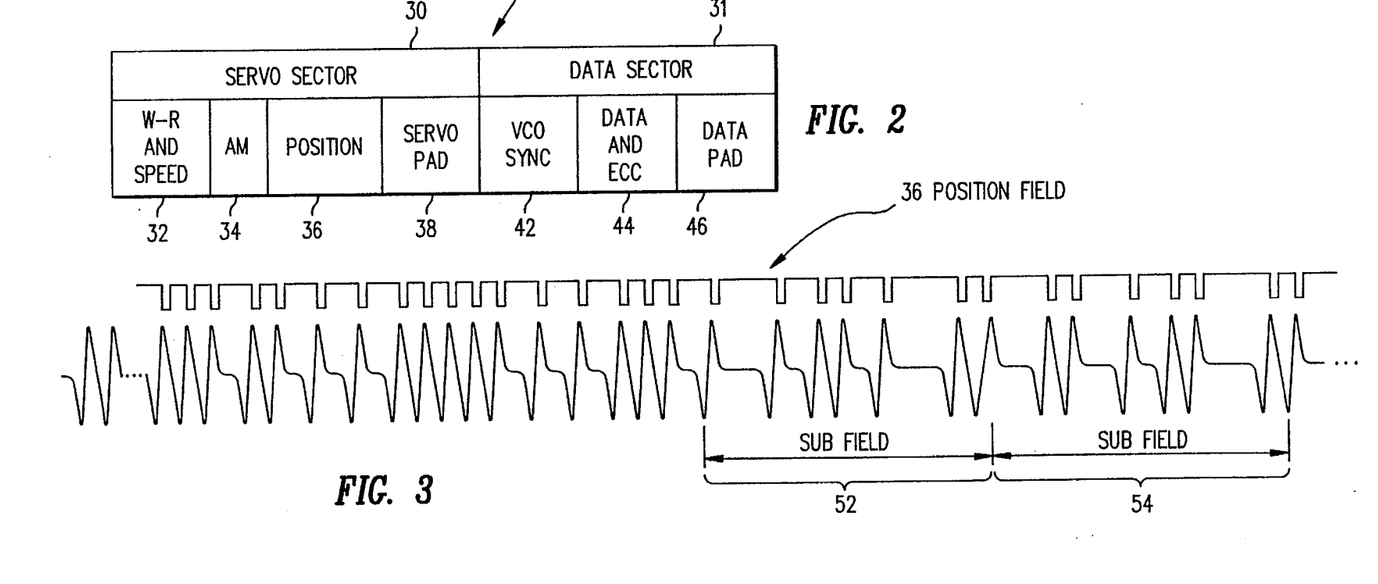
FIG. 2 is a diagram showing the sectors and fields on a track of the no-ID data sector disk file formatted in accordance with the preferred embodiment of the present invention.
FIG. 3 is a diagram showing a portion of the encoded cylinder address sub-sections stored in position field of a servo sector of the FIG. 2 embodiment.

Now referring to FIG. 2, there is shown a schematic diagram of a no-ID data segment 29 used in the preferred embodiment of the present invention. Data segment 29 comprises a servo sector 30 and a data sector 31. The servo sector 30 typically comprises write-to-read recovery and speed compensation field 32, address mark (AM) field 34, position field 36, and servo pad field 38. Data sector 31 which is the smallest individually addressable unit of user data typically comprises a VCO sync field 42, data and ECC field 44, and data pad field 46.

Write-to-read recovery and speed field 32 is used to allow the read/write electronics to switch from a data writing operation to a servo reading operation, and to allow for fluctuations in the disk rotational speed. Address mark field 34 identifies a specific position within the servo sector which is used as a timing reference. Position field 36 contains the actual servo information used to position the head, typically including a position error signal and other information such as a servo sector number (or any portion thereof) and head number (or any portion thereof). In the preferred embodiment of the present invention, field 36 also comprises a portion of the corresponding cylinder address. Servo pad field 38 allows for the electronics to switch from reading servo to writing/reading data, as well as for disk rotational speed variations.

VCO sync field 42 permits the read/write electronics to enable the voltage controlled oscillator (VCO) to obtain proper phase lock for reading the data. Data and ECC field 44 contains the user data and error correction information. Data pad 46 allows for differences in processing time for reading and writing data, as well as for flushing any encode/decode, and for disk rotational speed variations. Data pad 46 also provides sufficient time for the electronics to prepare for operating on the following servo or data sector.

Now referring to FIG. 3, there is shown a portion of position field 36 of FIG. 2 of the preferred embodiment of the present invention. Position field 36 where, in the preferred embodiment of the present invention, cylinder address sub-sections are stored, comprises sub-field 52 and sub-field 54. Sub-field 52 contains either high (Hi) order bits of the cylinder address or middle (Mid) order bits of the cylinder address depending on whether the servo sector number is an even number servo sector or an odd number servo sector, respectively. Sub-field 54 contains only the low (Lo) order bits of the cylinder address which is generally present in each position field 36 of each servo sector 30 as shown in table 1.

TABLE 1

| | Cylinder Address Sub-Sections | |
|---|---|---|
| Servo Sector No. | Sub-Field 52 | Sub-Field 54 |
| 0 | Hi order = $(a_{12}, a_{11}, a_{10}, a_9, a_8)$ | Lo order = $(a_4, a_3, a_2, a_1, a_0)$ |
| 1 | Mid order = $(a_8, a_7, a_6, a_5, a_4)$ | Lo order = $(a_4, a_3, a_2, a_1, a_0)$ |
| 2 | Hi order = $(a_{12}, a_{11}, a_{10}, a_9, a_8)$ | Lo order = $(a_4, a_3, a_2, a_1, a_0)$ |
| 3 | Mid order = $(a_8, a_7, a_6, a_5, a_4)$ | Lo order = $(a_4, a_3, a_2, a_1, a_0)$ |
| . | . | . |
| . | . | . |
| K | | |

Figure 4:
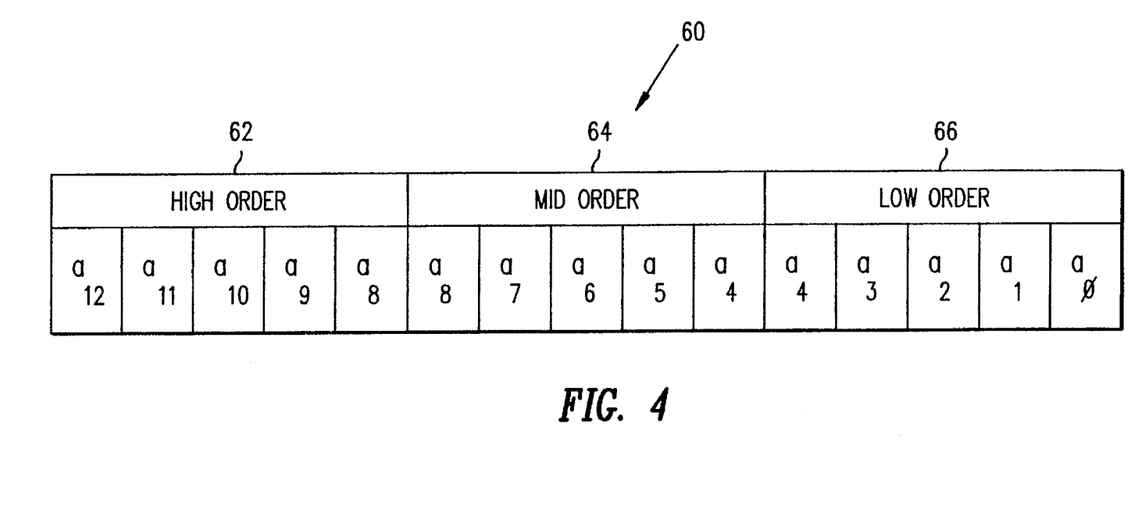
FIG. 4 is a diagram showing the sub-sections of encoded cylinder address of the preferred embodiment of the present invention with redundant bits.

Now referring to FIG. 4, there is shown an encoded cylinder address 60 of the preferred embodiment of the present invention. In the preferred embodiment, cylinder address is n bits long and is encoded according to "gray" code to ensure that cylinder address changes only one bit at a time as the head moves from one cylinder to the next contiguous cylinder. The number of bits, n, is generally dictated by the number of cylinders present in the disk drive. In the present invention cylinder address 60 is thirteen bits long and is sub-divided into three sub-sections, high order bits sub-section 62 which contains bits a12,a11,a10,a9,a8, middle order bits sub-section 64 which contains bits a8,a7,a6,a5,a4, and low order bits sub-section 64 which contains bits a4,a3,a2,a1,a0. In the preferred embodiment, sub-field 52 contains the 5 bits of either high order or middle order bits sub-sections of the cylinder address depending on whether the sector is an even number sector or odd number sector respectively and sub-field 54 contains the 5 bits of low order bits sub-section of the cylinder address.

Figure 5:
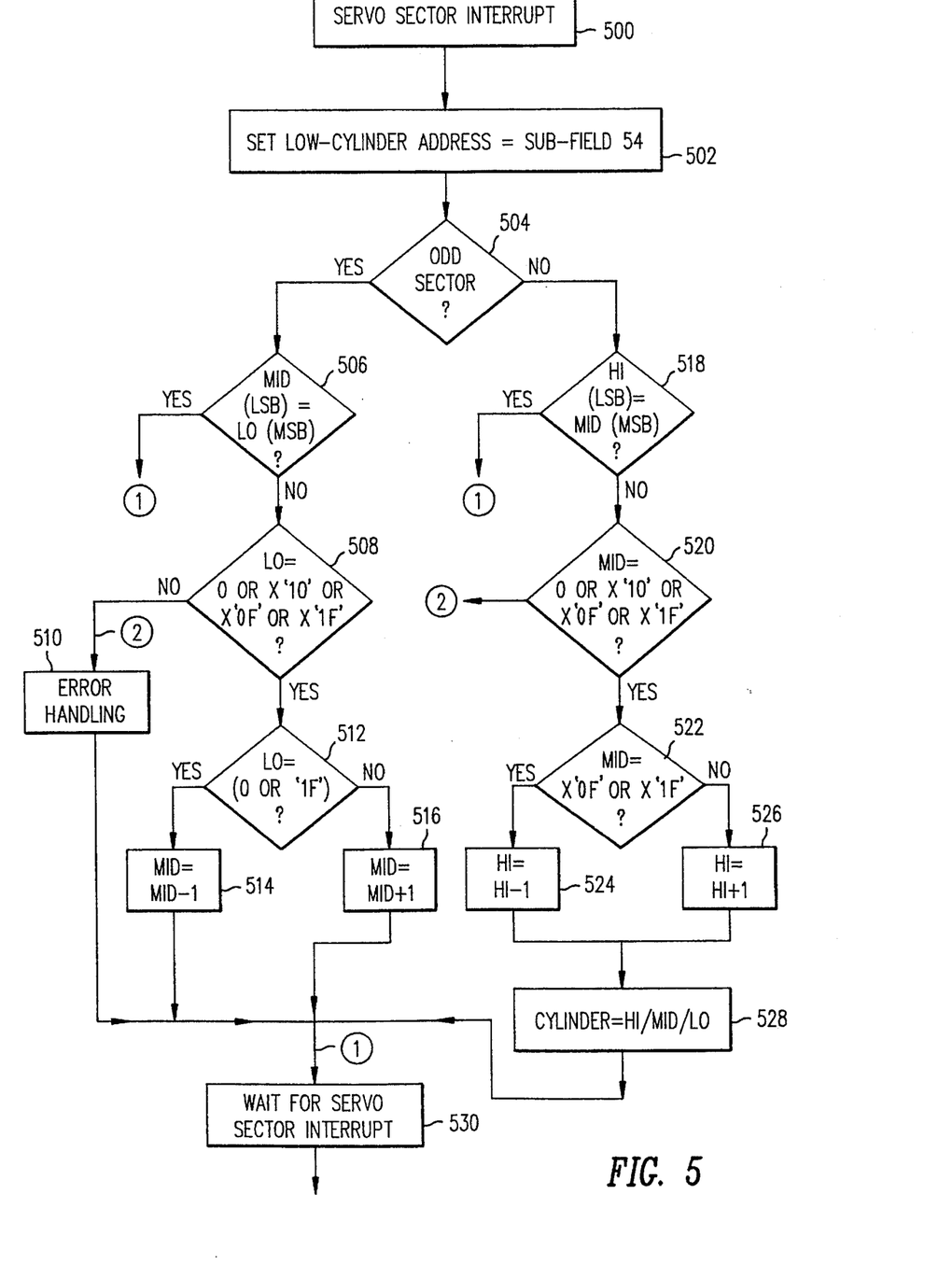
FIG. 5 is a flowchart depicting the use of redundant bits in stitching back together the sub-sections of a cylinder address according to the preferred embodiment of the present invention.

Note that the most significant bit (MSB) of low order bits sub-section 66, a4, is also repeated as the least significant bit (LSB) of middle order bits sub-section 64, a4, and the most significant bit (MSB) of middle order bits sub-section 64, a8, is also repeated as the least significant bit (LSB) of high order bits sub-section 62, a8. The redundant bits ensure that in reading sub-fields 52 and 54 of servo sectors to determine the associated cylinder address, only low order, middle order, and high order bits sub-sections which are stored on servo sectors of a single track and which together form a complete cylinder address are stitched back together rather than stitching low order, middle order, and high order bits sub-sections of different cylinder addresses stored in servo sectors of adjacent (contiguous) tracks. For example, in reading sub-fields 52 and 54 of servo sectors, if the corresponding redundant bits in sub-sections 52 and 54 do not match each other, but the rest of the bits read satisfy the "gray" code limitation that means that the head has read sub-fields that were stored on adjacent tracks. When such an error is detected, error correction is invoked which by relying on "gray" code nature of the cylinder address either subtracts 1 from or add 1 to the partial address read from sub-field 52 to correct the error that has occurred in reading sub-fields in adjacent tracks. Note that if error is due to reading sub-fields that are not on adjacent tracks, not only redundant bits will not match, but the remaining bits will also be in violation of "gray" code. In such cases the aforementioned correction method does not work and seek operation is halted which leads to invocation of an error recovery routine. This method of using redundant bits in order to ensure that only low, middle, and high order bits sub-sections of a cylinder address stored in the servo sectors of a single track are stitched back together is further described more precisely in the pseudo code listed below which uses the structure of the PASCAL programming language but embeds English description. The pseudo code is also depicted by the flowchart of FIG. 5.

```
{ PSEUDO CODE FOR DETECTING, CORRECTING, AND
STITCHING PARTIAL CYLINDER ADDRESS
USING REDUNDANT BIT }

LOW CYLINDER = FIELD 2;
IF SECTOR NUMBER = ODD THEN BEGIN;
    MID CYLINDER = FIELD 1;
    IF REDUNDANT BIT NOT EQUAL THEN BEGIN; { MID(LSB) < >
LO(MSB) }
        IF LOW < > ( 0 OR 0F OR 10 OR 1F ) THEN ERROR;
        IF LOW = (0F OR 1F) THEN MID = MID − 1;
        IF LOW = (00 OR 10) THEN MID = MID + 1;
        END; { IF MID(LSB) < >LO(MSB) }
END; { IF SECTOR NUMBER = ODD }
IF SECTOR NUMBER = EVEN THEN BEGIN;
    HI CYLINDER = FIELD 1;
    IF REDUNDANT BIT NOT EQUAL THEN BEGIN; { HI(LSB) < >
MID(MSB) }
        IF MID < > ( 0 OR 0F OR 10 OR 1F ) THEN ERROR;
        IF MID = (0F OR 1F) THEN HI = HI − 1;
        IF MID = (00 OR 10) THEN HI = HI + 1;
        END; { IF HI(LSB) < > MID(MSB) }
    CYLINDER_ADDRESS = (HI SHL 8) OR (MID SHL 4) OR (LO)
END; { IF SECTOR NUMBER = EVEN }
```

As shown in the pseuco code, stitching is carried out by shifting the bits stored in the high order bits sub-section to the left by eight bits position, shifting the bits stored in the middle order bits sub-section to the left by four bits position, and then performing logical OR function of the shifted high and middle order bits sub-sections with low order bits sub-section. The stitching operation is carried out by the servo processor.

The partial addresses listed in columns 1 and 2 of table 2 below provides examples of no error, error in redundant bit field, and severe errors which is defined as redundant bits mismatch plus gray code violation for middle and low order bits sub-sections. Similar examples would also be applicable to high and middle order bits sub-sections. Column 3 of table 2 shows the combined middle and low order bits sub-sections of a cylinder address if no error is detected, if redundant bits mismatch is detected and error correction is carried out, or if severe error is detected and operation is halted. Note that in the case of severe error where redundant bits do not match and the partial addresses in sub-fields 52 and 54 are also in violation of "gray" code, the severe error signal is communicated from the servo electronics to the servo processor to halt the seek operation in progress.

TABLE 2

| MID Order Bits | LOW Order Bits | COMBINED MID + LOW |
|---|---|---|
| 00000 | 11110 | SEVERE ERROR |
| 11111 | 11111 | 1111 1 1111 |
| 00000 | 11111 | 1111 1 1111 |
| 11111 | 00000 | 0000 0 0000 |
| 00000 | 00000 | 0000 0 0000 |
| 11111 | 00001 | SEVERE ERROR |
| 00000 | 01111 | 0000 0 1111 |
| 00001 | 01111 | 0000 0 1111 |

TABLE 2-continued

| MID Order Bits | LOW Order Bits | COMBINED MID + LOW |
|---|---|---|
| 00000 | 10000 | 0000 1 0000 |
| 00001 | 10000 | 0000 1 0000 |

TABLE 2-continued

| MID Order Bits | LOW Order Bits | COMBINED MID + LOW |
|---|---|---|
| 00000 | 10001 | SEVERE ERROR |

It is understood by those skilled in the requisite art that cylinder address may be longer or shorter than thirteen bits depending on the number of cylinders present in the disk drive and that cylinder address 60 may be sub-divided into any number of sub-sections. For example, it may be preferable to sub-divide an n bit cylinder address into n sub-sections each containing only one bit and storing each sub-section in only one sector on a given track. Or it may be preferable to have more than a single redundant bit in each sub-section.

Figure 6:
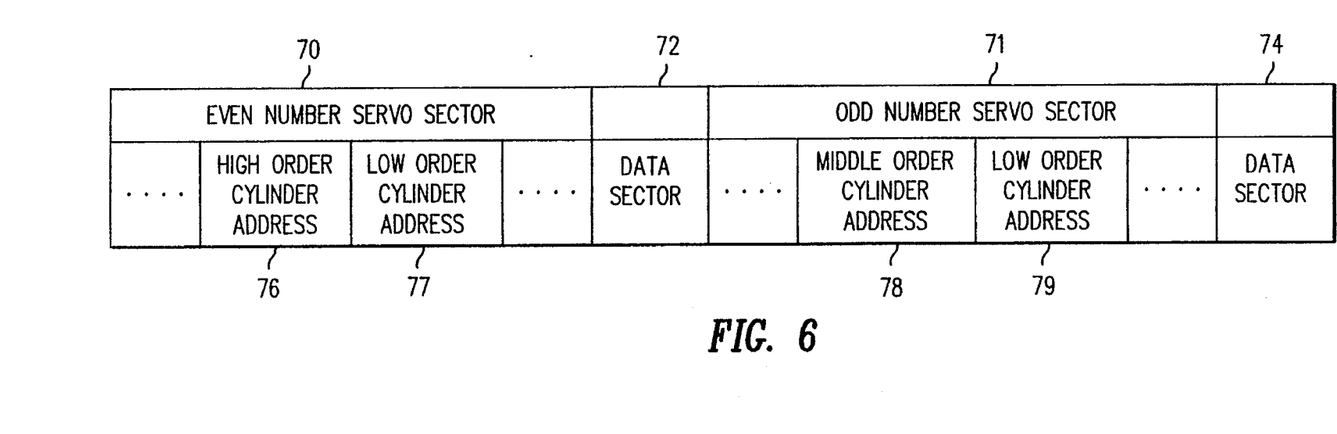
FIG. 6 is a diagram showing a portion of an even number servo sector and an odd number servo sector on the same track of the preferred embodiment of the present invention.

Now referring to FIG. 6, there is shown a portion of an even number servo sector 70 and a portion of an odd number servo sector 71 of a track in the disk drive of the present invention. Even number sector 70 comprises sub-field 76 which includes high order bits cylinder address and sub-field 77 which includes low order bits cylinder address. Odd number sector 71 comprises sub-field 78 which includes middle order bits cylinder address and sub-field 79 which includes low order bits cylinder address. Now referring to FIG. 6, in order to reconstruct the cylinder address, information in sub-fields 76, 78, 77 and 79 are read using the magnetic head and are first checked to ensure that redundant bits match each other. If redundant bits do not match, the error is corrected as described in detail above. If redundant bits do match each other, then sub-fields are stitched together by the servo processor and the stitched cylinder address is then compared with the target cylinder address. If the stitched cylinder address match the target cylinder address it means that the desired cylinder has been reached. Consequently, the appropriate track within that cylinder is accessed for the purpose of either reading data or writing data.

Now by referring to FIGS. 2, 4 and 6 it can readily be seen that using the preferred embodiment of the present invention, only ten (10) bits of cylinder address 60 (FIG. 4 (including a redundant bit) is stored in each servo sector 30 (FIG. 2) rather than fifteen (15) bits of address (including redundant bits) thus reducing the storage requirement by about 33% and increasing the seek velocity by about 200%.

Figure 7:
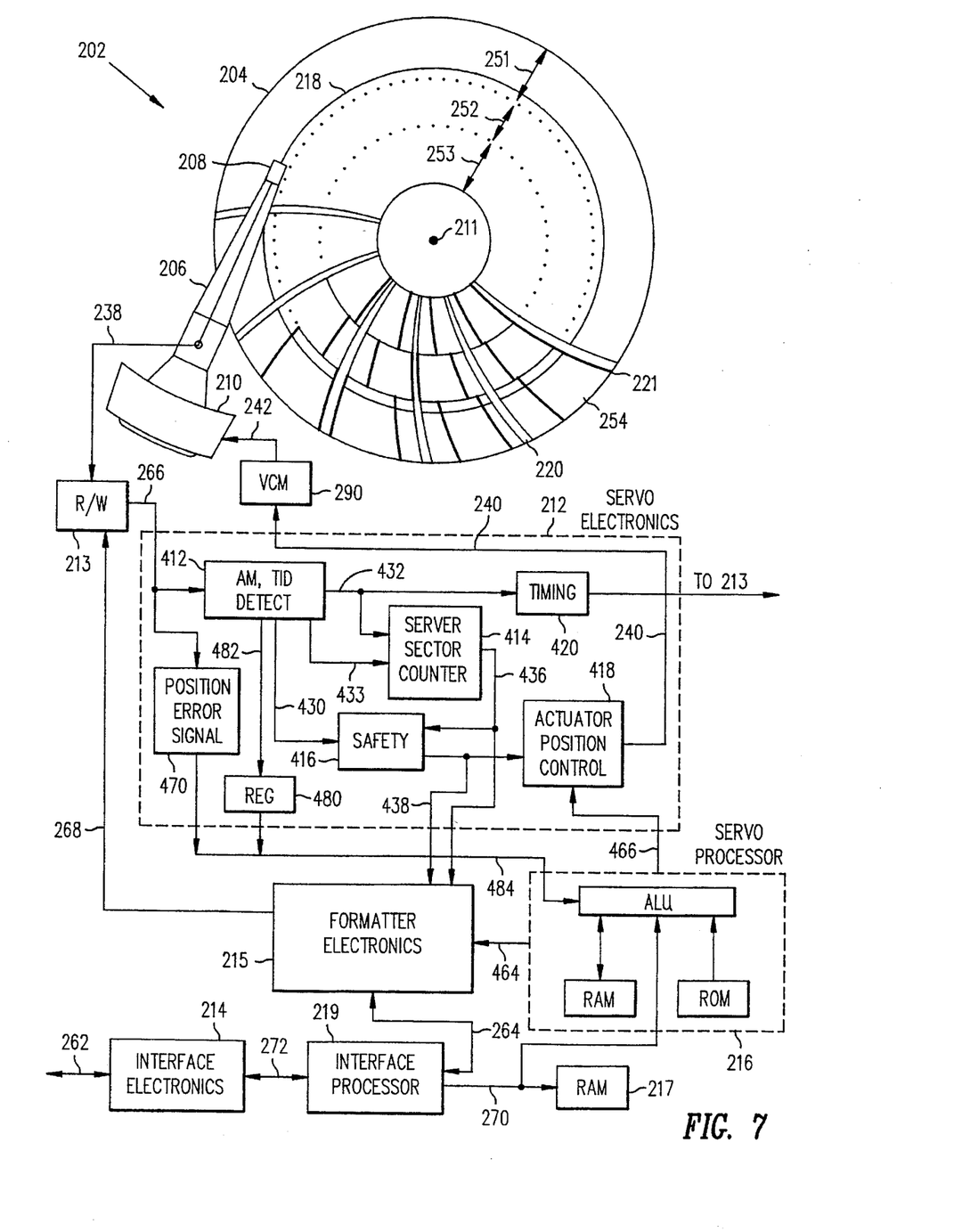
FIG. 7 is a schematic diagram showing a hardware implementation of a FBA disk drive in accordance with the preferred embodiment of the present invention.

Now referring to FIG. 7, there is shown a preferred embodiment of the disk drive 202 of the present invention. The disk drive 202 is formatted using a fixed block architecture (FBA) utilizing sector servo, no-ID and zone-bit recording. The drive 202 comprises a magnetic recording disk 204 mounted on a shaft (not shown), an actuator arm 206, a recording head 208 (also referred to as recording transducer) mounted on actuator arm 206 and in communication with disk 204, a voice coil module 290 in communication with voice coil magnet 210 for controlling the movement of the arm 206 and thus the positioning of the head 208 over the disk surface. Disk drive 202 further comprises a servo electronics 212 in communication with the voice coil module 290, a read/write (R/W) electronics 213 in communication with the servo electronics 212 and the actuator arm 206 and providing the means for, among other things, reading cylinder information. Drive 202 also comprises an interface electronics 214 in communication with interface processor 219 and a host computer (not shown), a formatter electronics 215 in communication with interface processor 219, servo electronics 212, R/W electronics 213, and servo processor 216, servo processor 216 also in communication with the servo electronics 212, formatter electronics 215, interface processor 219 and a RAM 217 over the communication bus 270.

Disk 204 comprises center of rotation 211 and is divided for head positioning and data storing purposes into a set of radially spaced tracks, one of which is shown as track 218. The tracks are grouped radially into a number of zones, three of such zones are shown as zones 251, 252 and 253. The number of tracks in each zone is generally different from the number of tracks in the other zones. The tracks on the disk surfaces in the disk stack (not shown) which lie at equal radii are identified by a cylinder number.

Disk 204 further comprises a plurality of servo sectors 220 which extend across the tracks in a generally radial direction. Each track has a reference index 221. Within each zone, the tracks are also circumferentially divided into a number of data sectors 254. In the preferred embodiment, the data sectors 254 contain no-ID region. Note that the number of data sectors per track varies from zone to zone. In the preferred embodiment, the servo sectors 220 are labelled as either an even number servo sector or an odd number servo sector.

Servo electronics 212 comprises an address mark detector and track number decoder (AM, TID) 412 for, among other things, decoding partial cylinder address, timing generation logic 420 for generating timing signals necessary for operation of servo electronics 212 in a manner known in the requisite art and also providing timing signals necessary for detecting sub-fields 52 and 54, servo sector counter 414 for providing current servo sector number at its output, safety logic 416 for performing various safety tests to ensure the proper operation of the servo electronics, actuator position control 418 for comparing, among other things, cylinder value received from servo processor 216 and comparing it with cylinder information received from safety logic 416 and acts upon any errors, registers 480 for storing partial cylinder address, and position error signal 470 for, among other things, determining the track position of head 208 all in working relation with each other for precisely controlling the actuator motion and detecting and retrieving, among other things, sub-fields 52 and 54 where partial cylinder addresses are stored.

During the read/write operation of drive 202, interface processor 219 receives a request for reading or writing data sectors 254 from the host through the interface electronics 214 in the form of a logical block address (LBA). The LBA is converted into a physical block address (PBA) and PBA is converted into a ZCHS in interface processor 219 using a defect map and a zone table, respectively. The ZCHS information is then communicated to servo processor 216 which uses the ZCHS value to initiate a seek operation by computing the proper control value and communicates that value to actuator position control 418 of servo electronics 212. Actuator position control 418 functions in a manner known in the requisite art by providing the appropriate signal to voice coil module 290 in order to effectuate the movement of head 208 mounted on arm 206 toward the target track.

As head 208 passes over the tracks toward the desired track in the target cylinder, read/write electronics 213 receives servo signals from head 208 and passes those signals to servo electronics 212. The servo signals comprise, among other things, partial cylinder address stored on even and odd numbers servo sectors on each track that passes under head 208. Read/write electronics 213 in turn communicates the partial cylinder address to AM detector 412. AM and TID detector 412 decodes the TID information, including partial cylinder address, and stores the partial cylinder address in registers 480 from which it is communicated to servo processor 216. AM detector 412 also communicates address mark found to servo sector counter 414 and timing logic 420 via interface 432. Servo processor, using a microcode similar to the pseudo code listed above, checks for redundant bit mismatching and possible "gray" code violation and if no violation is found, stitches the partial cylinder address back together to construct the complete cylinder address. The completely stitched cylinder address is then compared with the target cylinder address by servo processor 216 to determine whether desired cylinder is reached or not.

The comparison process continues until the stitched cylinder address matches the desired cylinder address which at that point servo electronics 212 is instructed to position head 208 over the desired track and begins either writing onto or reading from the desired data sectors. As servo sectors 220 pass under the head 208, the no-ID approach described in the aforementioned U.S. patent application Ser. No. 07/727,680 is used to identify each servo sector. In brief, an index mark identifies the first servo sector on the track, an address mark locates subsequent servo sectors on that track, and a count of address marks uniquely identifies each servo sector on that track.

In an alternative embodiment, sub-fields 52 and 54 not only include redundant bits for detecting and preventing the occurrence of multiple bits changing during reading cylinder address sub-sections, but to further minimize the possibility of reading sub-field 52 of one track followed or preceded by reading sub-field 54 of a adjacent track, cylinder address sub-sections stored at sub-fields 52 and 54 that are radially aligned are further made radially offset (radially offset cylinder address sub-sections) from each other across the disk surface. The minimum physical offset between subfields radially aligned, from one track to an adjacent track is about the width of the read head which is about 1 bit wide although larger offsets could be employed.

This alternative embodiment using the combination of redundant bits in cylinder address sub-sections and radially offset cylinder address sub-sections stored in sub-fields that are radially aligned is further described more precisely in the pseudo code listed below which uses the structure of the PASCAL programming but embeds English description.

```
{ PSEUDO CODE FOR REDUNDANT BIT WITH
PATTERN OFFSET }

LOW CYLINDER = FIELD 2;
IF SECTOR NUMBER = ODD THEN BEGIN;
    MID CYLINDER = FIELD 1 - OFFSET;
    IF LOW BOUNDARY THEN LOW(MSB) = MID(LSB);
END;
IF SECTOR NUMBER = EVEN THEN BEGIN;
    HI CYLINDER = FIELD 1 - OFFSET;
    IF MID BOUNDARY THEN MID(MSB) = HI(LSB)
    CYLINDER_ADDRESS = (HI SHL 8) OR
    (MID SHL 4) OR (LO)
END;
```

Figure 8A:
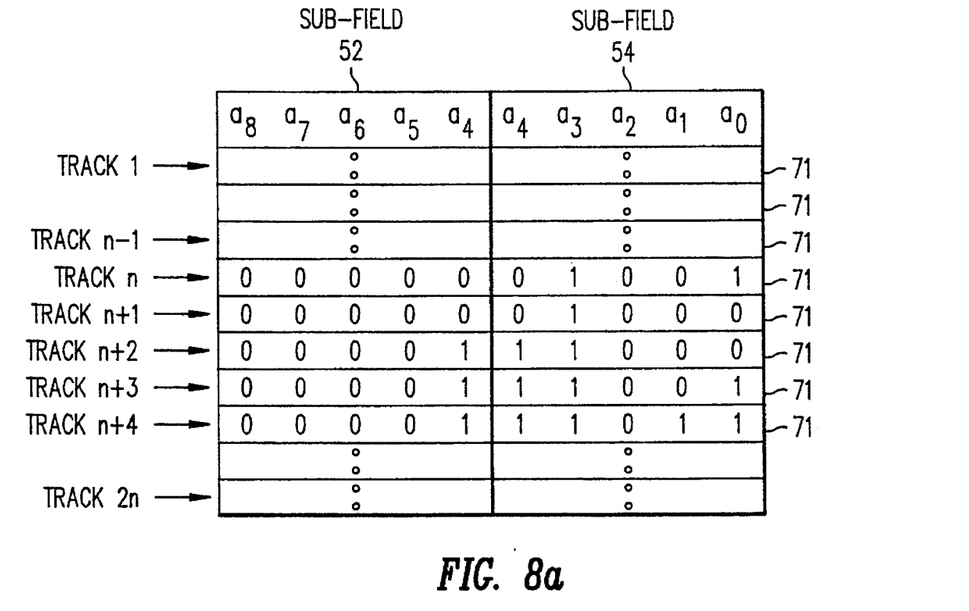
FIG. 8a is a diagram showing a portion of the encoded cylinder address stored in an odd number servo sectors of contiguous tracks of a disk of the preferred embodiment of the present invention.
Figure 8B:
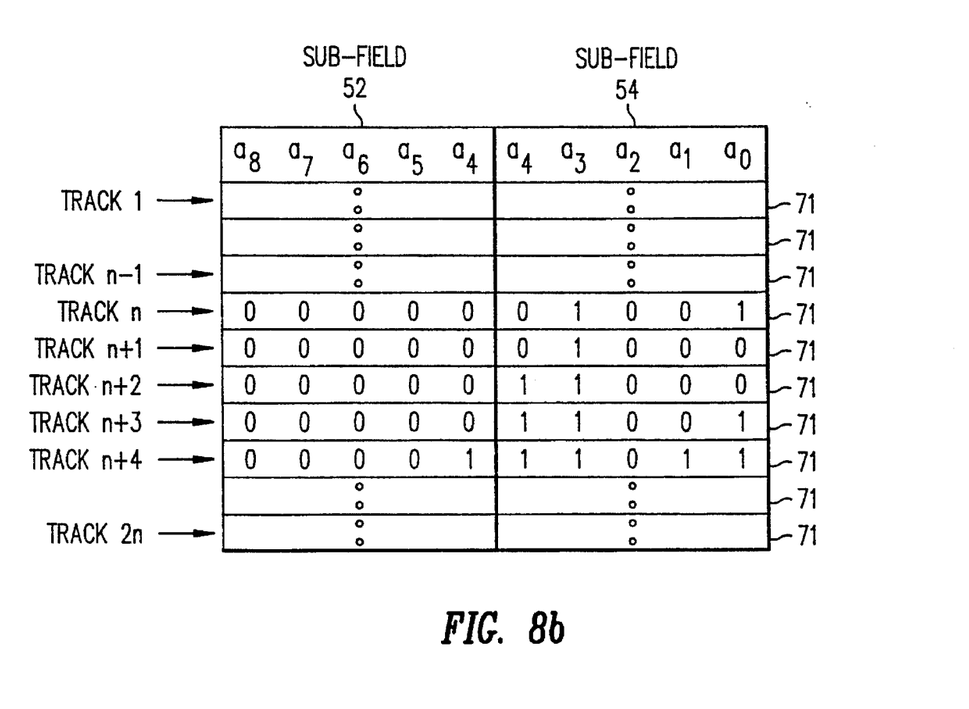
FIG. 8b is a diagram showing a portion of the encoded cylinder address stored in an odd number servo sectors of contiguous tracks of a disk of an alternative embodiment of the present invention with redundant bits and radially offset cylinder address sub-sections.

The difference between the preferred embodiment and the alternative embodiment described in the previous paragraph is further illustrated by referring to FIGS. 8a and 8b.

Now referring to FIG. 8a, there is shown a portion of radially aligned odd number servo sectors 71 on the contiguous tracks of a disk. The tracks are labelled 1, ..., n–1, n, n+1, n+2, n+3, n+4, .... 2n. Each servo sector 71 comprises the middle and low order bits cylinder address stored in its sub-fields 52 and 54, respectively. Now referring to the cylinder address for contiguous tracks n through n+4, it can readily be seen that the cylinder addresses are "gray" coded and redundant bits are also utilized.

Now referring to FIG. 8b, there is shows a portion of radially aligned odd number servo sectors 71 on the contiguous tracks of a disk. The tracks are labelled 1, ..., n–1, n, n+1, n+2, n+3, n+4, ..., 2n. Each servo sectors 71 comprises corresponding middle and low order bits cylinder address stored in its sub-fields 52 and 54, respectively. Now referring to the cylinder addresses for contiguous tracks n through n+4, it can readily be seen that the cylinder addresses are "offset gray" coded by two bits and redundant bits are also utilized. By comparing the cylinder addresses illustrated in FIGS. 8a and 8b, it can be easily seen that in this alternative embodiment, the amount of "offset gray" code utilized in the middle order bits cylinder addresses are two bits although lower or higher number of offset may be used.

A number of embodiments of the present invention have been described. Nevertheless, it will be understood that various modifications may be made without departing from the spirit and the scope of the invention. For example, instead of dividing the complete cylinder address into three partial addresses, one may use more or less number of partial addresses. Or instead of using only one redundant bit per cylinder address sub-section, one may use more redundant bits per sub-section in order to increase the accuracy and reliability of error detection. Alternatively, the disk drive system may utilize only a single processor for carrying out address conversions and controlling servo electronics rather than two processors. Accordingly, it is to be understood that the invention is not to be limited by the specific illustrated embodiments, but only by the scope of the appended claims.

We claim:

1. A disk drive system, comprising:

a data recording disk having radially spaced tracks, each track having a plurality of servo sectors; and, a cylinder address for identifying each track, said cylinder address divided into a plurality of cylinder address sub-sections where each sub-section comprises a partial cylinder address and wherein a predetermined number of said cylinder address sub-sections, less than the total number of said cylinder address sub-sections, are stored in each servo sector embedded on each track;

a head mounted in said disk drive system for reading said cylinder address sub-sections; and a servo system in communication with said head to construct a cylinder address from said cylinder address sub-sections.

2. A disk drive system as recited in claim 1, further comprising a processor for stitching back together said cylinder address sub-sections into a stitched cylinder address and comparing said stitched cylinder address with a desired cylinder address.

3. A disk drive system as recited in claim 2, wherein said cylinder address is divided into three sub-sections referred to as a high order bits sub-section, a middle order bits sub-section, and a low order bits sub-section.

4. A disk drive system as recited in claim 3, wherein said high order bits, middle order bits, and low order bits sub-sections are gray coded and each of said sub-sections is stored in a predetermined number of servo sectors on a track.

5. A disk drive system as recited in claim 4, wherein said cylinder address sub-sections are stored in a position field of servo sectors of a track, said servo sectors identified as either even number servo sectors or odd number servo sectors.

6. A disk drive system as recited in claim 5, wherein said position field comprises a first and second sub-field, said first sub-field comprises a high order bits sub-section if a servo sector number is even and comprises a middle order bits sub-section if a servo sector number is odd, and wherein said second sub-field comprises a low order bits sub-section.

7. A disk drive system as recited in claim 6, wherein at least two of said cylinder address sub-sections comprise a redundant bit for error detection.

8. A disk drive system as recited in claim 7, wherein cylinder address sub-sections stored in radially aligned servo sectors are radially offset from each other by a predetermined amount.

9. A disk drive system, comprising:

a data recording disk having radially spaced tracks, each track comprising a plurality of segments, each segment further comprising a data sector and a servo sector;

a cylinder address for identifying a track, said cylinder address divided into a plurality of cylinder address sub-sections where each sub-section comprises a partial cylinder address and wherein a predetermined number of said cylinder address sub-sections, less than the total number of said cylinder address sub-sections, are stored in each servo sector embedded on each track; and, an interface processor in combination with a servo processor for computing a desired cylinder address, stitching back together said cylinder address sub-sections to form a stitched cylinder address, and comparing said stitched cylinder address with said desired cylinder address using said servo processor.

10. A disk drive system as recited in claim 9, wherein said cylinder address is divided into three sub-sections referred to as a high order bits sub-section, a middle order bits sub-section, and a low order bits sub-section.

11. A disk drive system as recited in claim 10, wherein said high order bits, middle order bits, and low order bits sub-sections are gray coded and each of said sub-sections is stored in a predetermined number of servo sectors on a track.

12. A disk drive system as recited in claim 11, wherein said cylinder address sub-sections are stored in a position field of servo sectors, said servo sectors identified as either even number servo sectors or odd number servo sectors.

13. A disk drive system as recited in claim 12, wherein said position field comprises a first and second sub-field, said first sub-field comprises a high order bits sub-section if a servo sector number is even and comprises a middle order bits sub-section if a servo sector number is odd, and wherein said second sub-field comprises a low order bits sub-section.

14. A disk drive system as recited in claim 13, wherein at least two of said cylinder address sub-sections comprise a redundant bits for error detection.

15. A disk drive system as recited in claim 14, wherein cylinder address sub-sections stored in radially aligned servo sectors are radially offset from each other by a predetermined amount.

16. A disk drive system, comprising:
a data recording disk having radially spaced tracks, each track comprising a plurality of segments, each segment comprising a data sector and a servo sector;
a cylinder address for a track, said cylinder address divided into a plurality of cylinder address sub-sections each sub-section comprising a partial address, wherein a predetermined number of said cylinder address sub-sections, less than the total number of said cylinder address sub-sections, are stored in each servo sector embedded on each track;
an actuator arm having a magnetic head in communication with said tracks;
a read/write electronics in communication with said actuator arm;
a servo electronics in communication with said read/write electronics and said actuator arm; and,
a processor in communication with said servo electronics, said processor, read/write electronics, and servo electronics in working combination for reading back said cylinder address sub-sections, stitching back together said cylinder address sub-sections to form a stitched cylinder address, and comparing said stitched cylinder address with a desired cylinder address.

17. A disk drive system as recited in claim 16, wherein said cylinder address is divided into three sub-sections referred to as a high order bits sub-section, a middle order bits sub-section, and a low order bits sub-section.

18. A disk drive system as recited in claim 17, wherein said high order bits, middle order bits, and low order bits sub-sections are gray coded and each of said sub-sections is stored in a predetermined number of servo sectors on a track.

19. A disk drive system as recited in claim 18, wherein cylinder address sub-sections are stored in a position field of servo sectors, said servo sectors identified as either even number servo sectors or odd number servo sectors.

20. A disk drive system as recited in claim 19, wherein said position field comprises a first and second sub-field, said first sub-field comprises a high order bits sub-section if a servo sector number is even and comprises a middle order bits sub-section if a servo sector number is odd, and wherein said second sub-field comprises a low order bits sub-section.

21. A disk drive system as recited in claim 20, wherein at least two of said cylinder address sub-sections comprise a redundant bit for error detection.

22. A disk drive system as recited in claim 21, wherein cylinder address sub-sections stored in radially aligned servo sectors are radially offset from each other.

23. In a disk drive system comprising
a data recording disk having radially spaced tracks, each track comprising a plurality of segments, each segment comprising a data sector and a servo sector;
a cylinder address for a track;
an actuator arm having a magnetic head in communication with said tracks;
a read/write electronics in communication with said actuator arm;
a servo electronics in communication with said read/write electronics and said actuator arm; and,
a processor in communication with said servo electronics, a method of storing said cylinder address, comprising the steps of:
dividing said cylinder address into a plurality of cylinder address sub-sections, each sub-section comprising a portion of said cylinder address; and,
storing a predetermined number of said cylinder address sub-sections, less than the total number of said cylinder address sub-sections, in each servo sector embedded on each track.

24. A method as recited in claim 23, wherein said cylinder address is divided into three sub-sections referred to as a high order bits sub-section, a middle order bits sub-section, and a low order bits sub-section.

25. A method as recited in claim 24, wherein said high order bits, middle order bits, and said low order bits sub-sections are gray coded and each of said sub-sections is stored in a predetermined number of servo sectors on a track.

26. A method as recited in claim 25, wherein cylinder address sub-sections are stored in a position field of servo sectors, said servo sectors identified as either even number servo sectors or odd number servo sectors.

27. A method as recited in claim 26, wherein said position field comprises a first and second sub-field, said first sub-field comprises a high order bits sub-section if a servo sector number is even and comprises a middle order bits sub-section if a servo sector number is odd, and wherein said second sub-field comprises a low order bits sub-section.

28. A method as recited in claim 27, wherein at least two of said cylinder address sub-sections comprise a redundant bits for error detection.

29. A disk drive system as recited in claim 28, wherein cylinder address sub-sections stored in radially aligned servo sectors are radially offset from each other.

30. In a disk drive system comprising:
a data recording disk having radially spaced tracks, each track comprising a plurality of segments, each segment comprising a data sector and a servo sector;
a cylinder address for a track;
an actuator arm having a magnetic head in communication with said tracks;
a read/write electronics in communication with said actuator arm;
a servo electronics in communication with said read/write electronics and said actuator arm; and,
a processor in communication with said servo electronics, a method of reading said cylinder address, comprising the steps of:
dividing said cylinder address into a plurality of cylinder address sub-sections, each sub-section comprising a portion of said cylinder address;

storing a predetermined number of said cylinder address sub-sections, less than the total number of said cylinder address sub-sections, in each servo sector embedded on each track;

reading back said cylinder address sub-sections generally during write and read operations;

stitching back together said cylinder address sub-sections to form a stitched cylinder address; and comparing said stitched cylinder address with a desired cylinder address to determine whether the head has reached the desired cylinder.

31. A method as recited in claim 30, wherein said cylinder address is divided into three sub-sections referred to as a high order bits sub-section, a middle order bits sub-section, and a low order bits sub-section.

32. A method as recited in claim 31, wherein said high order bits, middle order bits, low order bits sub-sections are gray coded and each of said sub-sections is stored in a predetermined number of servo sectors on a track.

33. A method as recited in claim 32, wherein cylinder address sub-sections are stored in a position field of servo sectors, said servo sectors identified as either even number servo sectors or odd number servo sectors.

34. A method as recited in claim 33, wherein said position field comprises a first and second sub-field, said first sub-field comprises a high order bits sub-section if a servo sector number is even and comprises a middle order bits sub-section if a servo sector number is odd, and wherein said second sub-field comprises a low order bits sub-section.

35. A method as recited in claim 34, wherein at least two of said cylinder address sub-sections comprise a redundant bit for detecting errors.

36. A disk drive system as recited in claim 35, wherein cylinder address sub-sections stored in radially aligned servo sectors are radially offset from each other.

* * * * *